United States Patent [19]

Schmidts et al.

[11] Patent Number: 4,610,618

[45] Date of Patent: Sep. 9, 1986

[54] HYDRAULIC PRESS

[75] Inventors: Klaus Schmidts; Dieter Therolf; Ulrich Weber, all of Dortmund, Fed. Rep. of Germany

[73] Assignee: Hoesch Aktiengesellschaft, Fed. Rep. of Germany

[21] Appl. No.: 770,636

[22] Filed: Aug. 28, 1985

[30] Foreign Application Priority Data

Sep. 1, 1984 [DE] Fed. Rep. of Germany ....... 3432286

[51] Int. Cl.[4] ........................ B29C 17/00; B29C 3/00; B29F 1/00; B30B 11/00

[52] U.S. Cl. .................................... 425/383; 425/394; 425/406; 425/451.2

[58] Field of Search ............... 425/383, 384, 385, 394, 425/406, 451.2, DIG. 221, DIG. 223, 451.9

[56] References Cited

U.S. PATENT DOCUMENTS

| | | | |
|---|---|---|---|
| 2,820,250 | 1/1958 | Stratton | 425/406 X |
| 3,545,372 | 12/1970 | Mueller | 425/384 X |
| 4,457,684 | 7/1984 | Gram | 425/451.9 |
| 4,461,164 | 7/1984 | Laviano | 425/394 X |
| 4,552,524 | 11/1985 | Schmidts et al. | 425/451.2 X |
| 4,565,517 | 1/1986 | Brinkmann et al. | 425/451.2 X |

FOREIGN PATENT DOCUMENTS

| | | | |
|---|---|---|---|
| 1127069 | 4/1962 | Fed. Rep. of Germany | 425/DIG. 221 |

*Primary Examiner*—J. Howard Flint, Jr.

*Attorney, Agent, or Firm*—McCormick, Paulding & Huber

[57] ABSTRACT

In an hydraulic press, usable as a press for forming composite sheet material, with a press base, several vertical guides extending out of the press base and a cross head slidably arranged on the vertical guides, which cross head is hydraulically clampable to the vertical guides, with a slidable press plate and a press drive, wherein several long stroke hydraulic cylinders are provided for adjusting the cross head and several short stroke hydraulic cylinders create the stroke of the press plate. The vertical guides and the cross head are made with several guide laminations clampable together in order to realize a guide and coupling system at small construction expense.

4 Claims, 6 Drawing Figures

HYDRAULIC PRESS

The invention concerns an hydraulic press, useful as a press for forming composite sheet material, with a press base, several vertical guides extending out of the press base and a cross head slidably arranged on the vertical guides, which cross head is hydraulically clampable to the vertical guides and having a slidable press plate and a press drive, there being several long stroke hydraulic cylinders for adjusting the cross head and several short stroke hydraulic cylinders for creating the stroke of the press plate.

An hydraulic press of the foregoing type is known from DE-OS No. 32 07 242.

In such press the vertical guides for guiding the cross head are round guide columns. The clamping of the cross head to the round guide columns takes place through hydraulically operable clamping devices the clamps of which have guide bores with longitudinal slots.

Such a guide and coupling system for the cross head requires a relatively large construction expense.

The invention has as its object the provision in a press of the aforementioned kind a guide and coupling system for a slidably arranged cross head which can be realized at little expense.

In accordance with the invention this object is attained by having the vertical guides and the cross head made with several guide laminations which are tightenable against one another. Preferably each guide lamination of the vertical guides has a longitudinal opening.

At least one tensioning rod is associated with the guide laminations of two vertical guides and the cross head.

In the following the invention is described in more detail in association with the drawings in which an embodiment of the invention is schematically illustrated. The drawings are:

Figure 1:
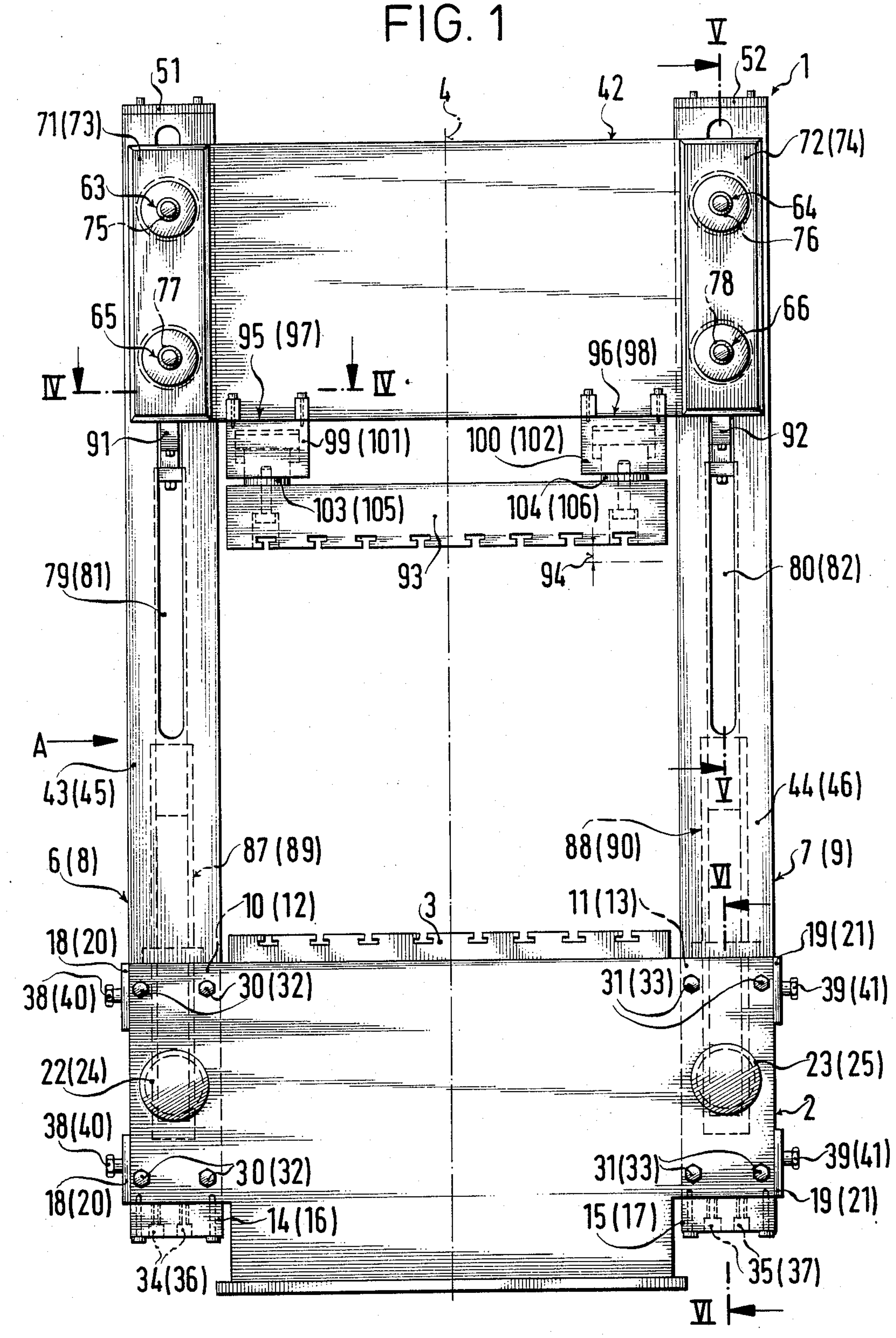
FIG. 1 is a front view of an hydraulic press embodying the invention.

An hydraulic press 1 has a press base 2 with a press table 3 and four vertical guides 6, 7, 8, 9 arranged symetrically to the middle 4, 5 of the press.

Each vertical guide 6, 7, 8, 9 is received in a recess 10, 11, 12, 13 in the press base, each of which recesses is limited at its lower end by a screw attached abutment flange 14, 15, 16, 17 and is limited on one side by two screw attached plates 18, 19, 20, 21.

Figure 6:
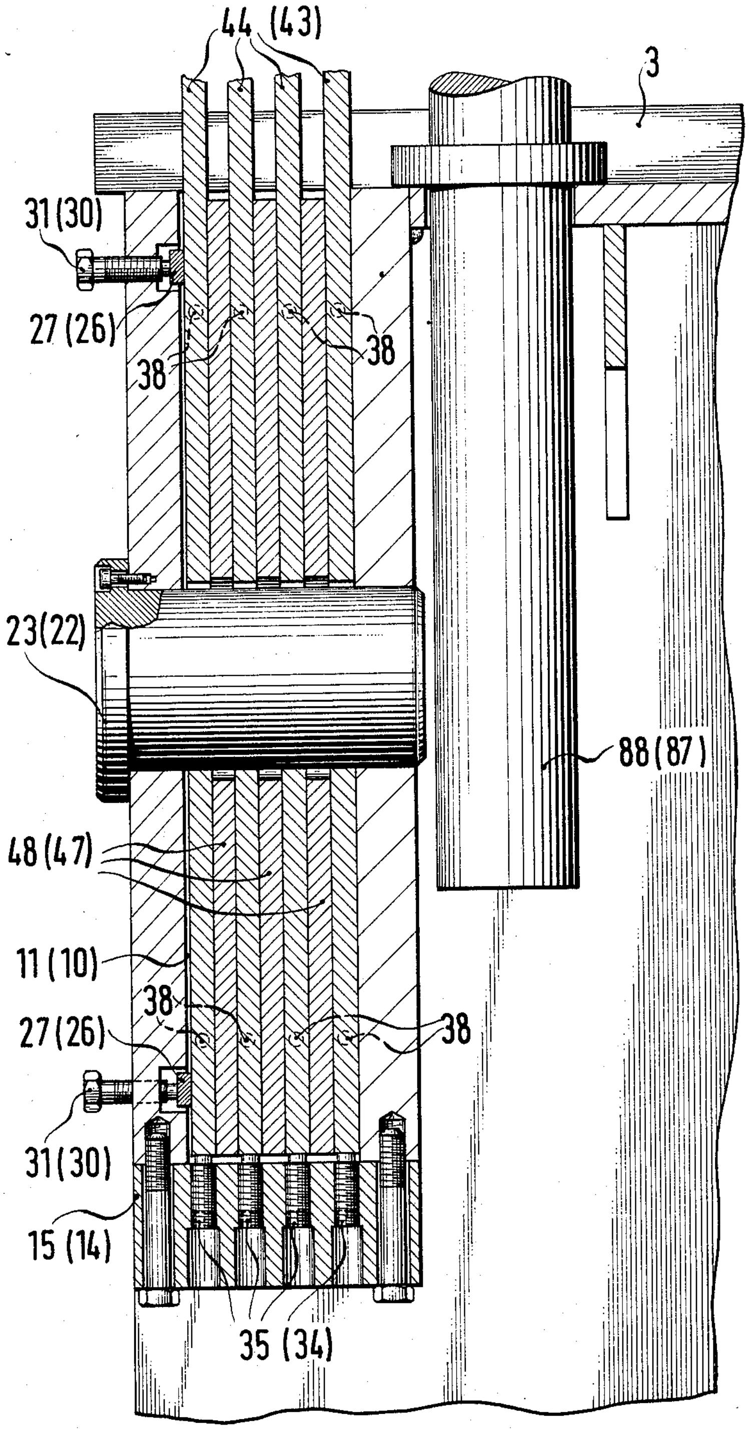
FIG. 6 is a fragmentary sectional view in enlarged scale taken through the press on the line VI—VI of FIG. 1.

A bolt 22, 23, 24, 25, two clamping bars 26, 27, 28, 29, four clamping screws 30, 31, 32, 33, eight lower clamping screws 34, 35, 36, 37 and eight lateral clamping screws 38, 39, 40, 41 (shown only in FIGS. 1 and 6) are provided for fastening each vertical guide 6, 7, 8, 9 with the press base 2.

The four vertical guides 6, 7, 8, 9 serve to vertically guide a cross head 42.

Each vertical guide 6, 7, 8, 9 includes (FIG. 6) four guide laminations 43, 44, 45, 46 which are held in the press base 2 in spaced relation to one another by three intermediate plates 47, 48, 49, 50. Above the cross head 42, the guide laminations 43, 44, 45, 56 of the vertical guides 6, 7, 8, 9 are held spaced from one another by two screw attached ties 51, 52.

The guide laminations 43, 44, 45, 46 of the vertical guides 6, 7, 8, 9 mate with ten guide laminations 53 to 62 of the cross head 42.

The coupling of the cross head 42 to the four vertical guides 6, 7, 8, 9 is effected by four hydraulically driven tensioning rods 63, 64, 65, 66 with which are associated four fixed tensioning jaws 67, 68, 69, 70 and four moveable tensioning jaws 71, 72, 73, 74.

The tensioning rods 63, 64, 65, 66 are received in four holes 75, 76, 77, 78 of the guide laminations 53 to 62 and in longitudinal holes 79, 80, 81, 82 in the guide laminations 43, 44, 45, 46.

The tensioning movement of the tensioning rods 63, 64, 65, 66 is obtained by the application of pressurized oil to the four annular spaces 83, 84, 85, 86.

Four long stroke plunger cylinders 87, 88, 89, 90 are used for the heighth adjustment of the cross head 42, two of said cylinders being rigidly connected to a beam 91, 92 screw connected to the guide laminations 53 to 62.

A press plate 93 is arranged between the press table 3 and the cross head 42, the stroke 94 (FIG. 1) of which press plate 93 is produced by four short stroke hydraulic cylinders 95, 96 97, 98.

The cylinder housings 99, 100, 101, 102 are screw connected to the cross head 42, and the piston rods 103, 104, 105, 106 are screw connected to the press plate 93.

With regard to the operation of the press, at the beginning of a pressing procedure the cross head 42 is lowered by the plunger cylinders 87, 88, 89, 90 to a working position. In the course of this lowering of the cross head 42, the guide laminations 53 to 62 of the cross head 42 slide vertically downwardly on the guide laminations 43 to 46 of the vertical guides 6, 7, 8, 9.

The cross head 42 is coupled in its working position to the vertical guides 6, 7, 8, 9 by a tightening or clamping together of the guide laminations 53 to 62 with the guide laminations 43 to 46.

The tightening of the guide laminations 43 to 46 and 53 to 62 with one another is achieved by means of the four hydraulically driven tensioning rods 63, 64, 65, 66.

As soon as the cross head 42 is coupled to the vertical guides 6, 7, 8, 9, the four hydraulic cylinders 95, 96, 97, 98 produce the pressing movement of the pressing plate 93. The pressing force is transferred directly from the pressing plate 93 to a two part die (not illustrated) located on the press table 3.

Figure 2:
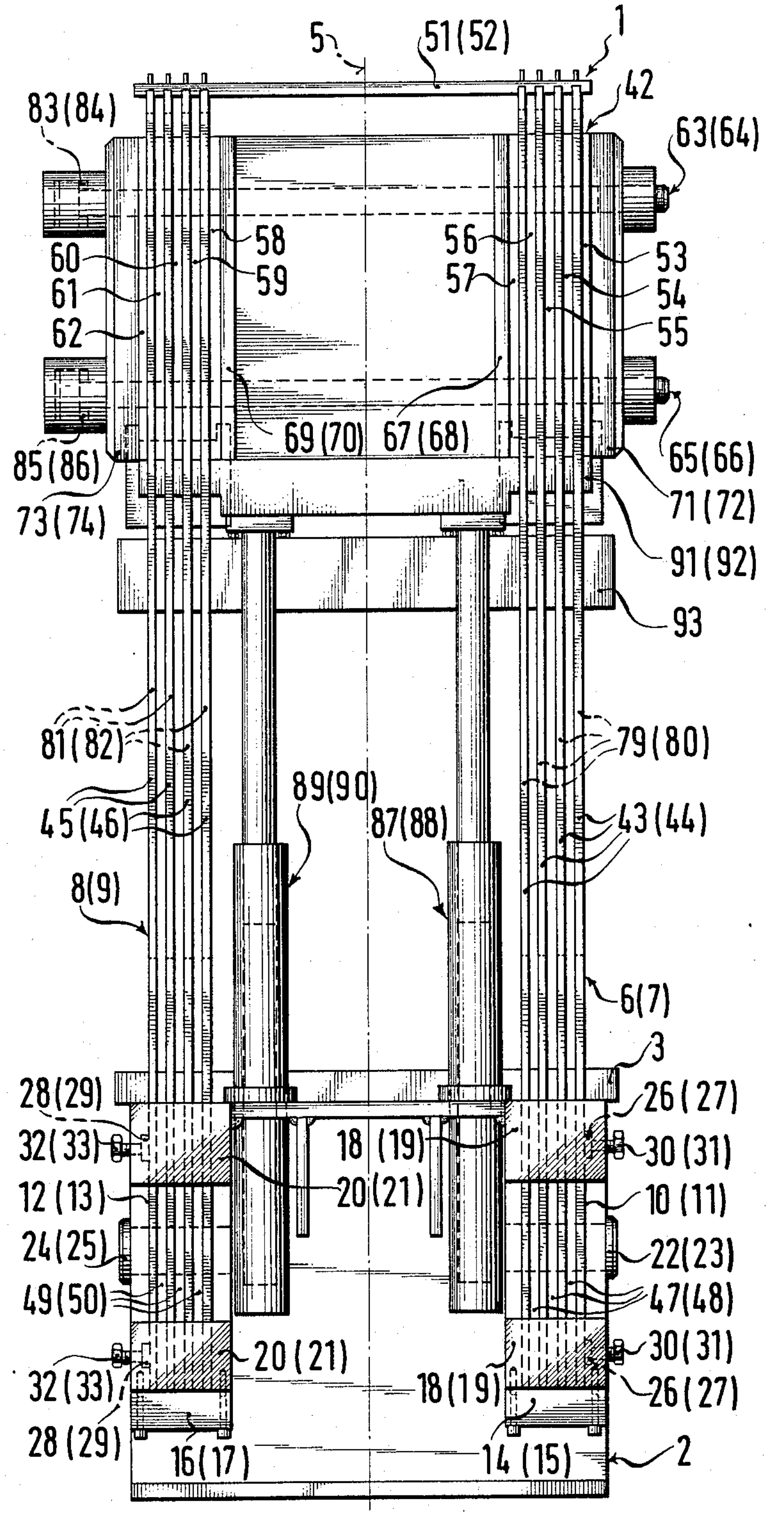
FIG. 2 is a side view of the press taken in the direction of the arrow A of FIG. 1.
Figure 3:
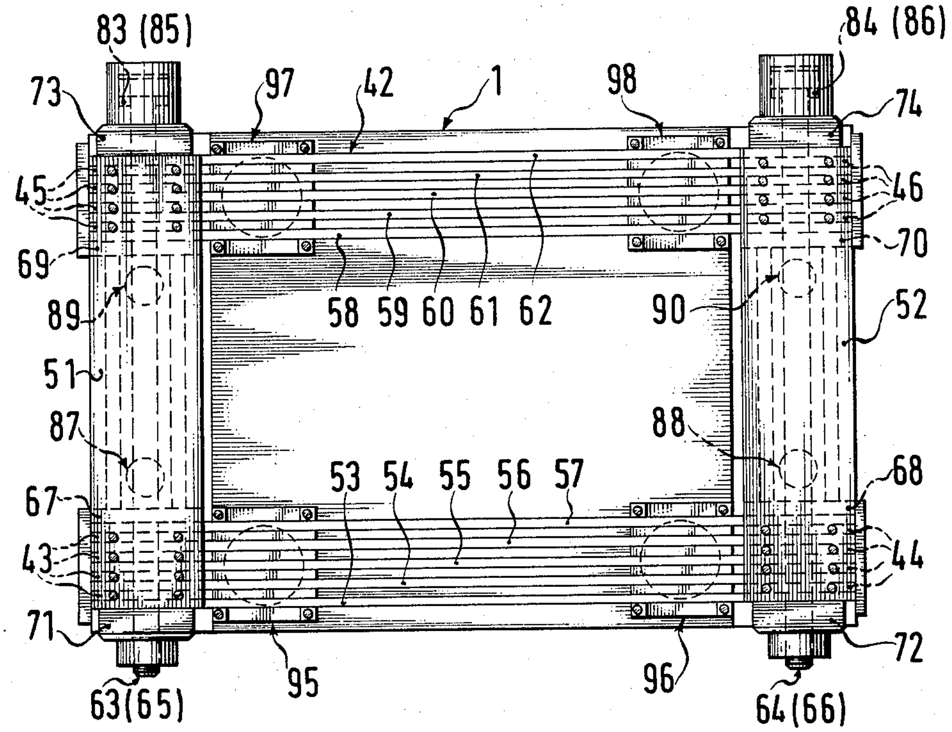
FIG. 3 is a top view of the press of FIG. 1.
Figure 4:
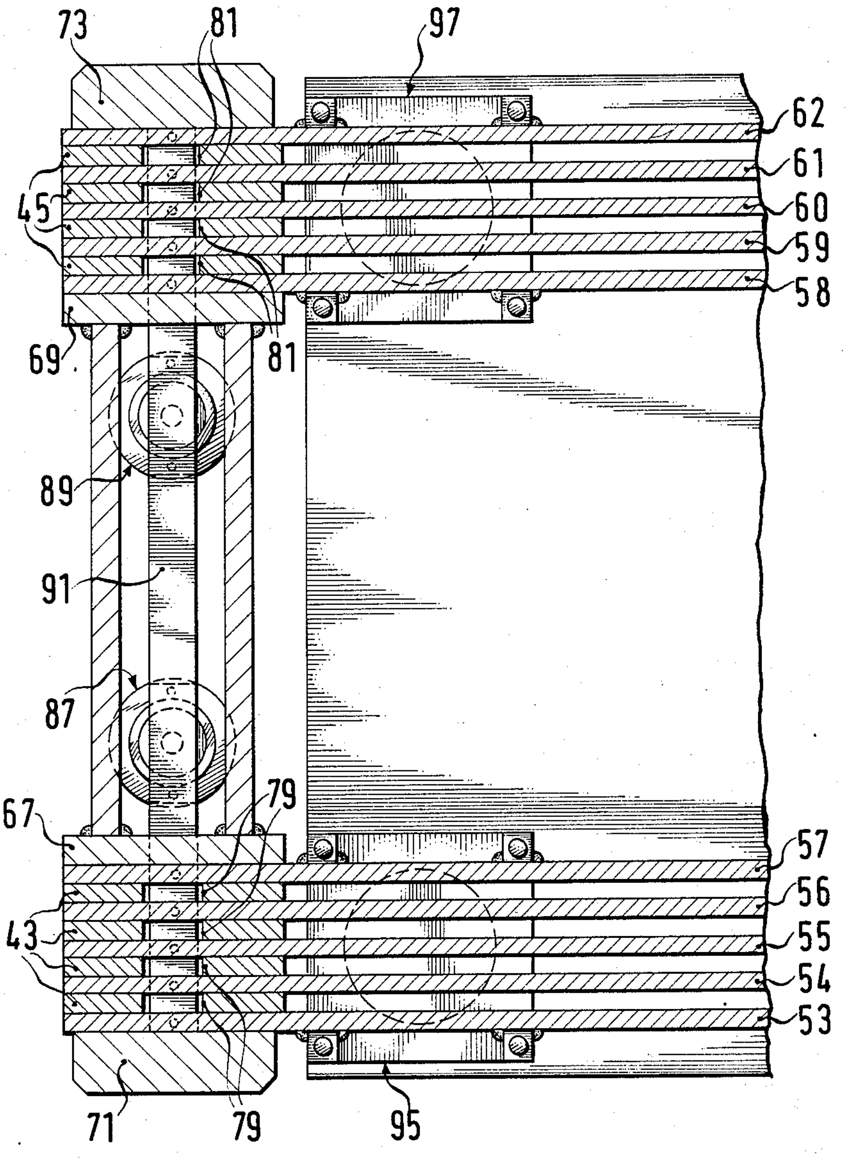
FIG. 4 is a fragmentary sectional view in enlarged scale taken through the press on the line IV—IV of FIG. 1.
Figure 5:
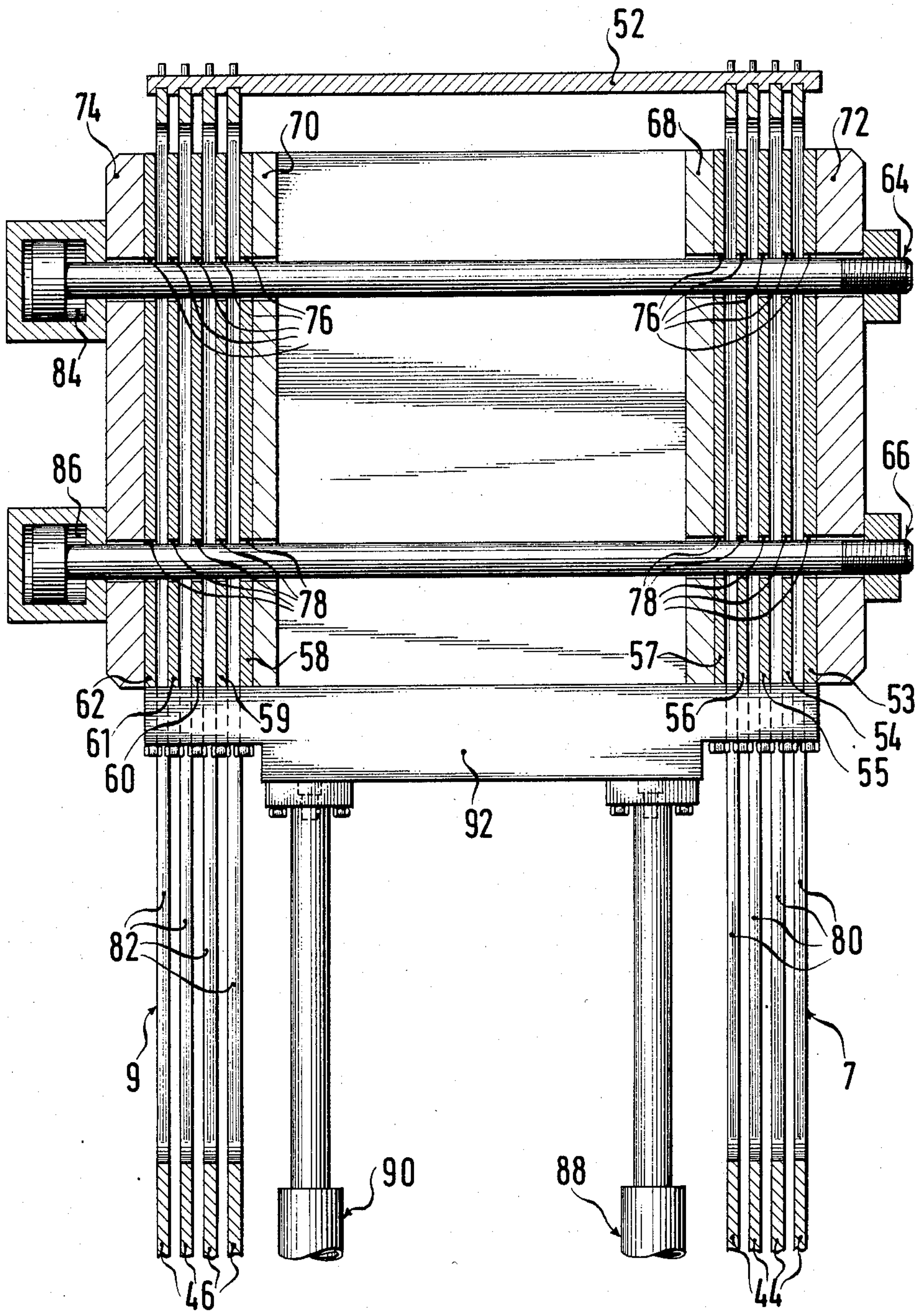
FIG. 5 is a fragmentary sectional view in enlarged scale taken through the press on the line V—V of FIG. 1.

After a predetermined time the press plate 93 and the cross head 42 are then accordingly returned to their starting positions (FIGS. 1 and 2).

We claim:

1. An hydraulic press, usable as a forming press for composite sheet material, with a press base, several vertical guides extending from the press base and a cross head slidably arranged on the vertical guides, which cross head is hydraulically clampable to the vertical guides, with a slidable press plate and a press drive, wherein several long stroke hydraulic cylinders are used to produce the adjustment of the cross head and several short stroke hydraulic cylinders create the stroke of the press plate, characterized in that the vertical guides are each made of several vertically extending laminations spaced from one another by spacing means in the press base, in that the cross head includes several other laminations extending into the spaces between said vertically extending laminations, and by means for releasably clamping said vertically extending laminations and said other laminations to one another to releasably clamp the cross head to the vertical guides.

2. An hydraulic press according to claim 1 further characterized in that each vertically extending lamination of the vertical guides has a longitudinal opening for accommodating a tensioning rod of the clamping means.

3. An hydraulic press according to claim 2 further characterized in that at least one tensioning rod is associated with the vertically extending laminations of two vertical guides and the associated other laminations of the cross head.

4. An hydraulic press according to claim 1 further characterized in that at least one tensioning rod is associated with the vertically extending laminations of two vertical guides and the associated other laminations of the cross head.

* * * * *